United States Patent [19]
Deschamps

[11] B 3,985,196
[45] Oct. 12, 1976

[54] SINGLE SWITCH SAFETY START SYSTEM
[75] Inventor: Joseph P. Deschamps, Naperville, Ill.
[73] Assignee: International Harvester Company, Chicago, Ill.
[22] Filed: July 22, 1974
[21] Appl. No.: 490,647
[44] Published under the second Trial Voluntary Protest Program on February 24, 1976 as document No. B 490,647.

[52] U.S. Cl. ............................ 180/103 R; 56/10.2; 56/10.5; 200/61.85; 200/61.89
[51] Int. Cl.² ..................... A01D 75/28; H01H 3/14; B60K 28/00
[58] Field of Search ........... 200/61.85, 61.88–61.91; 180/1 F, 54 D, 82 R, 53 R, 77 R, 103; 56/11.7, 11.8, 15.8, DIG. 15, 10.2, 10.5, 129; 192/.082, .09, .094, .098, 3.63, 84

[56] References Cited
UNITED STATES PATENTS

| | | | |
|---|---|---|---|
| 2,989,134 | 6/1961 | Kamlukin et al. | 180/1 F X |
| 3,419,115 | 12/1968 | Glenn | 200/61.89 X |
| 3,521,233 | 7/1970 | Inoue | 200/61.89 X |
| 3,608,285 | 9/1971 | Berk | 56/10.2 |
| 3,731,471 | 5/1973 | Bening | 180/53 R |
| 3,736,729 | 6/1973 | Peterson | 56/10.5 |
| 3,763,976 | 10/1973 | Prokop et al. | 192/3.63 |
| 3,811,020 | 5/1974 | Johnson et al. | 200/61.88 |

*Primary Examiner*—James R. Scott
*Attorney, Agent, or Firm*—Floyd B. Harman; William H. Wendell

[57] ABSTRACT

A safety start system for lawn and garden equipment in which a single safety switch completes the starting circuit of the power source by responding to the disengaged condition of both the main clutch and the implement clutch of the machine. The starting circuit is completed in direct response to the operator's moving the implement clutch handle to its disengaged position thereby permitting a resilient actuating member to close a safety switch and complete the circuit. The circuit is interrupted upon his engagement of the main clutch through a release of the clutch pedal which changes the deflection point of the resilient actuating member from the safety switch to linkage which is connected to the clutch pedal mechanism.

5 Claims, 4 Drawing Figures

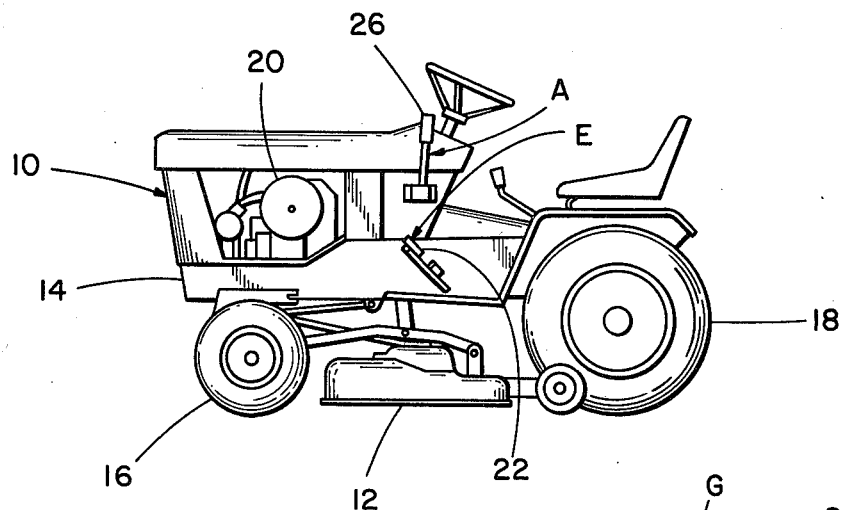
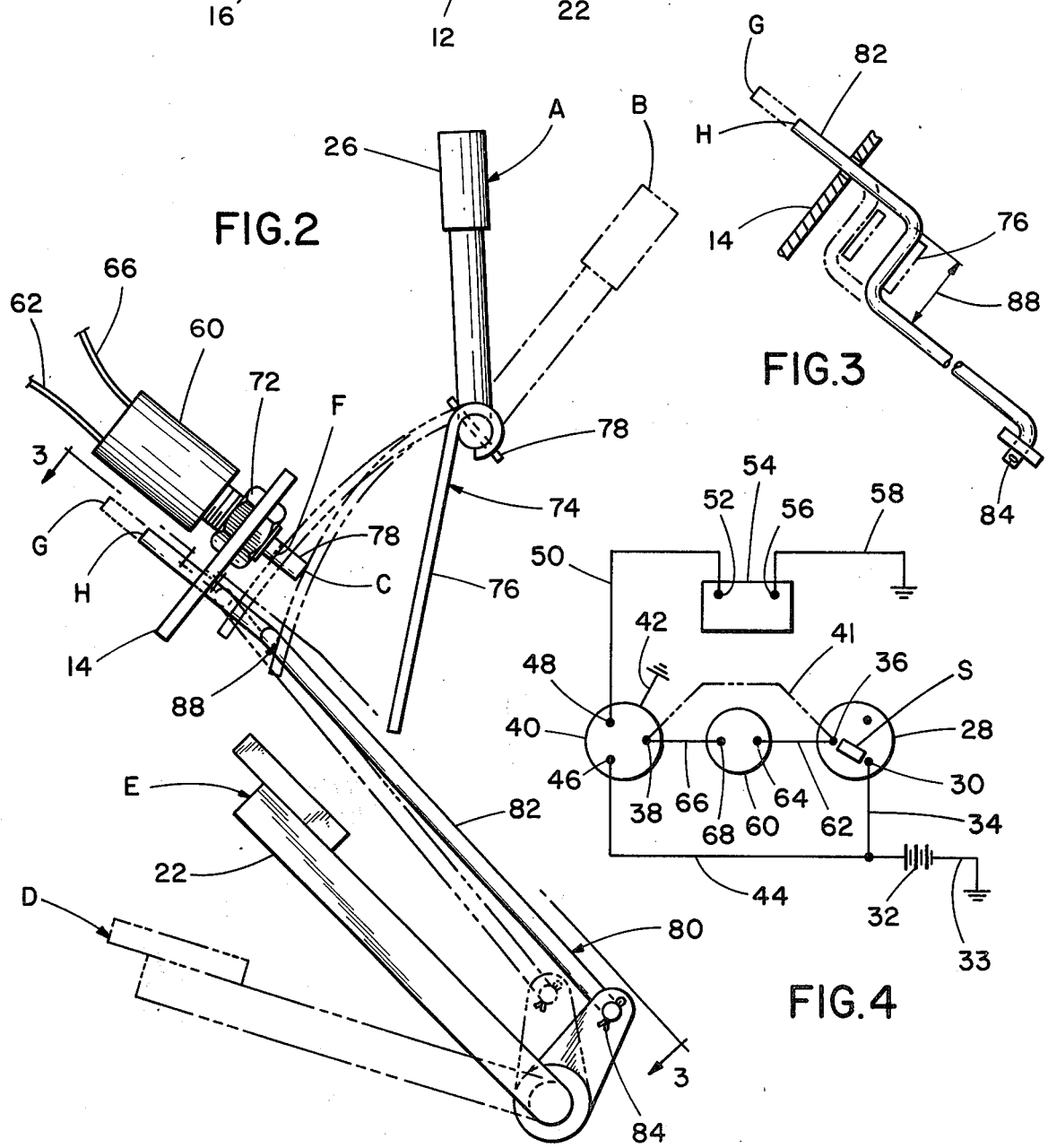

SINGLE SWITCH SAFETY START SYSTEM

This invention relates generally to a safety start system for lawn and garden equipment which prevents the operator from starting the power source when either the main clutch or the implement clutch is engaged. More particularly the invention concerns the use of a single electrical switch responding to the condition of the clutches through a linkage arrangement that optimizes the mechanical design by minimizing the possibility of a fatigue failure.

With the ever increasing number of lawn and garden machines that are being used by consumers, the need for safety starting systems to protect the operator from carelessly caused injury has become acute. Such systems must prevent the operator from starting the power source, whether it be electrical or internal combustion, until he has disengaged both the main drive clutch and the implement drive clutch.

The majority of the existing systems use a plurality of switches that are each responsive to one particular clutch or engine condition. This use of a number of switches, rather than one switch, unavoidably causes a higher price to the consumer by increasing the cost of the material required and the labor cost of assembling the greater number of elements. The plurality of switches also increases the possibility of a mechanical failure of the electrical system that would make the equipment susceptible to excessive maintenance in order to insure the integrity of the system.

There is one existing system using only one electrical switch that is responsive to the main and implement clutch condition, but this system does not provide the necessary safeguard while minimizing the consumer price. The systems unrecognized inadequacy was discovered to be in the use of its resilient switch closing member. This member would close the circuit and switch when the main drive clutch was disengaged, and would be retracted from this closed position by linkage attached to the implement clutch when the implement clutch was engaged.

Using this linkage arrangement the greater cycling of the main clutch during the operation of the machine causes a high fatigue factor in the design of the resilient member. This factor increases the material requirements for obtaining a satisfactory design life for the resilient members thereby increasing the consumer price. Accordingly, it is the primary aim of the present invention to overcome the problems of the prior systems while providing a functional and practical means for preventing the operator from starting the power source when either the main clutch or the implement clutch is engaged.

With more particularity, it is an object of the present invention to provide a safety start system which is relatively inexpensive and maximizes the usefulness of a mechanical characteristics of its elements.

Finally another object of the present invention is to provide a system of the class described which is easy to install, easy to maintain and dependable in its operation.

SUMMARY OF THE INVENTION

In accordance with the invention, the safety start system will function on a lawn and garden tractor having a mobile frame, steerable and traction wheels, a power source with a starting circuit mounted on the frame, a main clutch means operably connecting the power source and the traction wheels, and a power implement operably connected to the power source by an implement clutch means. The system comprises an electrical switch means in series with the starting circuit, a resilient contact means which closes the switch when the implement clutch is engaged, and a rigid opening means which will override the resilient contact means and open the switch when the main clutch is engaged.

BRIEF DESCRIPTION OF THE DRAWINGS

Other objects and advantages of the invention will become apparent upon reading the following detailed descriptions and upon reference to the drawings in which:

FIG. 1 is a side view of a mower attached to a lawn and garden tractor embodying the principle of the present invention;

FIG. 2 is a schematic view of the interrelationship of the safety starting switch and the controls of the main and implement clutch means;

FIG. 3 is a sectional view, taken on line 3—3 of FIG. 2, showing the relationship between the vehicle frame, the rigid opening means and the resilient contact means;

FIG. 4 is a schematic diagram of the circuitry of the safety start electrical system in accordance with the present invention.

DETAILED DESCRIPTION OF THE INVENTION

One combination of lawn and garden equipment in which the present invention can be incorporated is shown in FIG. 1. This Figure shows a lawn and garden tractor 10 with a power mowing implement 12 operably attached to the tractors mobile frame 14 which is mounted on steerable wheels 16 and traction wheels 18. In this combination the tractors power source is an internal combustion engine 20 which drives the vehicle traction wheels 18 through a conventional main clutch means (not shown).

In the present instance the main clutch means can have its driving connection engaged or disengaged by the operator's use of the clutch pedal 22. The preferred construction is typical of the conventional clutch connecting means which require positive action by the operator to disengage the drive connection. The clutch pedal 22 in FIG. 1 is shown in the normal engaged position E which is also shown as the solid pedal in FIG. 2. The disengaged condition is achieved when the operator depresses the clutch pedal 22 to the disengaged position D shown as dotted lines in FIG. 2.

In addition to the conventional main clutch means, the tractor-mower combination utilizes a conventional implement clutch means (not shown) to operatively connect the mowing implement 12 and the internal combustion engine 20. Using such implement clutch means the operator of the tractor can either engage the clutch means thereby completing the driving connection to the mowing implement 12 or he can disengage the clutch means and break the implement drive connection. In the illustrated combination the operator engages the implement clutch means by placing the implement clutch handle 26 in the engaged position A shown in FIG. 1 and shown as solid lines in FIG. 2. When the operator disengages the implement clutch means he places the implement clutch handle 26 in the disengaged position B shown as dotted lines in FIG. 2.

In accordance with the present invention the safety start system responds to the condition of the driving connection of both these clutch means. When both implement clutch means and main clutch means are disengaged the system will complete the lawn and garden tractor starting circuit, schematically diagrammed in FIG. 4, and permit the operator to start the vehicle.

In conventional lawn and garden equipment the internal combustion engine 20 is activated by the operator turning the conventional key switch 28, e.g. Idak switch No. C 457A, to the "start" position S. The starting circuit of the key switch 28 consists of a positive terminal 30 connected to the vehicles electrical storage battery 32 by a first electrical conducting means 34, and a negative terminal 36 which is connected to the closing terminal 38 of the magnetic switch 40 by the second electrical conducting means 41 (shown as dotted line). When the operator places the key switch 28 in the "start" position S, the current from the electrical storage battery 32, which is connected to ground by electrical connecting means 33, passes through the coil (not shown) of the magnetic switch 40 and goes to ground through a third electrical conducting means 42.

This current establishes a magnetic field in the magnetic switch 40 which closes the starting contacts (not shown) of the magnetic switch. The starting contacts are used to carry the high amperage necessary to provide power for cranking the internal combustion engine 20. This current will pass from the electrical storage battery 32 through the fourth electrical conducting means 44 to the positive terminal 46 of the magnetic switch, through the starting contacts of the magnetic switch to the negative terminal 48 of the magnetic switch. The current then travels through the fifth electrical conducting means 50 to the positive terminal 52 of the motor generator 54, through the motor generator and to ground through negative terminal 56 and the sixth electrical conducting means 58. When the current passes through the motor generator 54, the motor generator acts as a motor and turns the crank shaft (not shown) of the internal combustion engine 20 through use of conventional connecting means (not shown). With the motor generator turning the crank shaft, the engine 20 will start because the conventional fuel system (not shown) is responsive to the rotation of the crank shaft and the conventional ignition system (not shown) is operably connected to the electrical storage battery 32 when the key switch 28 is placed in the "start" position S.

In the preferred embodiment the safety starting system interrupts this starting circuit by placing an electrical switch means 60 in series with the key switch 28 and the magnetic switch 40. With the safety start system in the starting circuit, the second electrical conducting means 41 is replaced by a seventh electrical conducting means 62 connecting the negative terminal 36 of the key switch 28 and the positive terminal 64 of the electrical switch means 60, by the electrical switch means 60 and by an eight electrical conducting means 66 connecting the negative terminal 68 of the electrical switch means 60 and the closing terminal 38 of the magnetic switch means 40.

The structure of the preferred embodiment which controls the electrical switch means 60 is depicted in FIG. 2. The electrical switch means 60 comprises an electrical switch 60 connected to the tractors mobile frame 14 by connecting means 72. The electrical switch means 60 is closed by the force resulting from the deflection of the resilient switch actuator means 74 that comprises leaf spring means 76 which is rigidly attached to implement clutch handle 26 by retaining means 78. The deflection occurs when the operator rotates the implement clutch handle 26 clockwise from the engaged position A to the disengaged position B. The rigid connection between the implement clutch handle 26 and the leaf spring means 76 causes the leaf spring means to rotate in the same direction.

This rotation of the leaf spring means 76 is limited by the electrical switch 60 which is mounted to the mobile frame 14 in a position which interposes the spring biased button 79 of the electrical switch 60 in the path of the leaf spring means 76. The button 78 is biased outwardly by an internal spring having less force than a deflection force of leaf spring means 76. As a result, the relief spring means 76 deflects the button 78 to the closed position F when the implement clutch handle 26 is in the disengaged position B (FIG. 2) and the resulting deflection force of the spring means 76 overcomes the biasing spring force internally exerted within the switch 60 upon the button 78.

In the illustrated form the electrical switch 60 is also responsive to the drive condition of the main clutch means by the rigid opening means 80 limiting the travel of the leaf spring means 76. The preferred embodiment rigid opening means 80 comprises a link means 82 which is pivotally secured to the clutch pedal 22 by pin means 84. When the clutch pedal 22 is in the disengage position D, the link means 82 is in its extended position G in the frame guide hole 86, see FIGS. 2 and 3. In this extended position the blocking section 88 of the link means 82 does not interfere with the rotation of the leaf spring means 76, and the button 78 of the electrical switch 60 will be closed and complete the starting circuit when the implement clutch handle is its disengaged position B.

The disengaged position B of the implement clutch handle 26 cannot however, complete the starting circuit when the clutch pedal 22 is in the engaged position E, because this position makes the link means 82 assume its restricted position H. With the link means 82 in this restricted position H, its blocking section 88 contacts the leaf spring means 76 and changes the leaf spring means point of deflection from the button 78 to the blocking section 88. As a result of this change in deflection point, there is not enough force applied to the button 78 to overcome the force of the internal spring and close the circuit. A further result of the configuration of the invention is that the cyclic loading of the leaf spring means 76 is minimized because in most of the vehicles operations the implement clutch handle 26 will be in the engaged position A, and under these conditions the link means 82 does not contact the leaf spring means 76.

Thus it is apparent that there has been provided, in accordance with the invention, a safety start system for lawn and garden equipment that provides a functional and practical means for preventing the operator from starting the power source when either the main clutch or the implement clutch is engaged, which means is relatively inexpensive, maximizes the usefulness of all the mechanical characteristics of its elements and is easy to install, easy to maintain and dependable in its operation. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. For use with a lawn and garden tractor having a mobile frame with steerable wheels and traction wheels, a power source having a starting circuit mounted on said frame, a main clutch means operably connecting said power source and said traction wheels capable of selectively engaging and disengaging said operable connection by rotation of a clutch pedal, a power implement operably connected to said mobile frame and said power source, an implement clutch means capable of selectively engaging and disengaging said implement driving connection by rotation of an implement clutch handle, a safety start system comprising, in combination:

an electrical switch means in series with said starting circuit for closing said starting circuit will be when said clutch pedal and said implement clutch handle are in the disengaged position, and for opening said starting circuit when at least one of said implement clutch handle and said clutch pedal is in the engaged position;

a resilient switch actuator means mounted on and responsive to the rotation of said implement clutch handle for having the disengaged position of said implement clutch handle cause said resilient contact means to close said electrical switch means and complete said starting circuit;

a rigid opening means slidably mounted on said tractor, pivotally attached to said clutch pedal and responsive to the rotation of said clutch pedal for having the engaged condition of said main clutch means cause said rigid opening means to open said starting circuit by changing the deflection point of said resilient switch actuator means.

2. The combination of claim 1 further defined by said resilient switch actuator means comprising:

a retaining means;

a leaf spring means rigidly attached to said implement clutch handle by said retaining means for having the disengaged condition of said implement clutch handle cause said electrical switch means to deflect said leaf spring means thereby producing the closing force which closes said electrical switch means thereby completing said starting circuit.

3. The combination of claim 1 further defined by said rigid opening means comprising:

a link means pivotally attached to said clutch pedal and passing through said mobile frame for opening said starting circuit by changing the deflection point of said leaf spring means from said electrical switch means to said link means upon clutch pedal assuming its engaged position a pin means operably connecting said link means and said clutch pedal.

4. The combination of claim 2 further defined by said rigid opening means comprising:

a link means pivotally attached to said clutch pedal and passing through said mobile frame whereby leaf spring means is either returned from a closed position to or limited to a position where said electrical switch means and said starting circuit are opened;

a pin means operably connecting said link means and said clutch pedal.

5. The combination of claim 4 further defined by said electrical switch means comprising:

a connecting means;

an electrical switch rigidly attached to said mobile frame by said connecting means while being in series with said ignition circuit for closing said ignition circuit when said clutch pedal and implement clutch handle are in the disengaged position, and opening said starting circuit when at least one of said implement clutch handle and said clutch pedal is in the engaged position.

* * * * *